(12) United States Patent
Dubos et al.

(10) Patent No.: US 6,445,474 B1
(45) Date of Patent: Sep. 3, 2002

(54) OPTICAL TRANSMITTER USING TWO OR MORE OPTICAL SOURCES

(75) Inventors: Laurent Dubos, La Rue St Pierre; François Dumont, Etiolles, both of (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/321,326

(22) Filed: May 27, 1999

(30) Foreign Application Priority Data

May 29, 1998 (FR) ............................................. 98 06827

(51) Int. Cl.[7] ............................................. H04B 10/12
(52) U.S. Cl. ...................................... 359/173; 359/110
(58) Field of Search ................................ 359/173, 110, 359/187, 188

(56) References Cited

U.S. PATENT DOCUMENTS 4,952,820 A * 8/1990 Frisch ........................ 327/514
5,351,149 A 9/1994 Crimmins ................... 359/181

FOREIGN PATENT DOCUMENTS

| FR | 2525229 | 9/1983 |
| JP | 5937747 | 3/1984 |

OTHER PUBLICATIONS

Derwent Information Ltd. English–language abstract of patent FR 2524229 A (published Sep. 1983).*

* cited by examiner

Primary Examiner—Jason Chan
Assistant Examiner—Christina Y. Leung
(74) Attorney, Agent, or Firm—Daniel J. Piotrowski

(57) ABSTRACT

The transmitter comprises two optical sources (201, 202) simultaneously supplied with modulation current in series, whereas they are separately supplied with DC bias current. The separation between the modulating currents of the two optical sources is realized by means of inductances (214, 215, 227). A first optical source (201) receives on its anode the modulation signal coming from an input (216) and then emits the modulation signal to the second optical source (202) via a coupling capacitor (226) between the two optical sources.

7 Claims, 2 Drawing Sheets

140
OPTICAL TRANSMITTER USING TWO OR MORE OPTICAL SOURCES

BACKGROUND OF THE INVENTION

The present invention relates to an optical transmitter intended to transmit an optical signal through a broadband transmission network including at least one optical fiber that transports an optical signal from a transmitter to at least one optical receiver, the transmitter including at least two optical sources arranged in series and driven simultaneously.

The invention notably applies to video communication networks and to return channels of these networks.

An optical transmitter as defined in the opening paragraph above is known from U.S. Pat. No. 5,351,149. According to this document, various diodes are connected in series so as to produce more light and for transmitting in various directions; the group of senes-arranged diodes being connected to the same DC current supply and to the same AC current supply.

SUMMARY OF THE INVENTION

It is an object of the invention to improve the performance of the transmitter while facilitating the impedance matching between the output of an amplification circuit and the optical sources.

For this purpose, the transmitter includes means for separately supplying DC bias current to the optical sources and for supplying AC modulation current to them in series, while the separate DC currents biasing the optical sources flow via at least two inductances that have a value that is sufficient to practically block the flowing of the AC modulation current.

Particular embodiments of the invention will appear in the dependent claims 2 to 10.

BRIEF DESCRIPTION OF THE DRAWING

These and other aspects of the invention are apparent from and will be elucidated, by way of non-limitative example, with reference to the embodiments described hereinafter.

In the drawings:

FIG. 1 features a first embodiment, including two optical sources 101 and 102 connected directly in series. The sources are laser diodes, but a construction based on light-emitting diodes is also possible.

Figure 1:
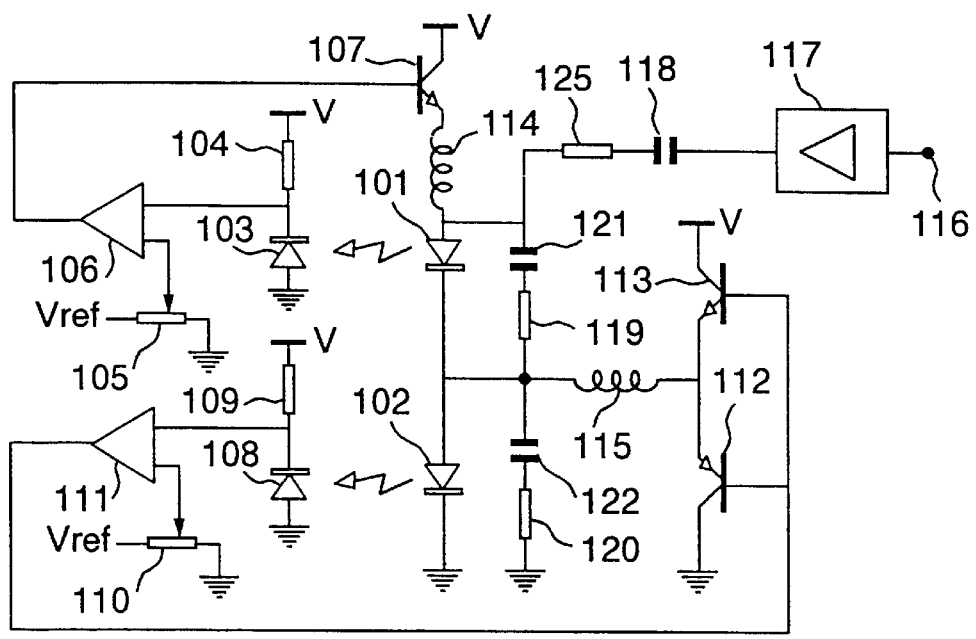
FIGS. 1 to 4 are electrical diagrams illustrating embodiments of the invention.

The optical power emitted by the laser diode 101 is kept constant thanks to a negative feedback loop including a photodiode 103 that receives the optical power emitted by the back face of the laser diode 101. The photodiode 103 is included in a bridge circuit formed by a resistor 104 and a potentiometer 105. A differential amplifier 106 amplifies in known manner the out-of-balance signal of the bridge and controls the average current passing through the laser diode 101 by means of the transistor 107.

Similarly, the average optical power emitted by the laser diode 102 is kept constant thanks to another negative feedback loop whose elements 108 to 111 correspond to the elements 103 to 106 respectively, of the adjusting circuit of the diode 101. The average current passing through the laser diode 102 is controlled by two transistors 112 and 113. If the transistor 113 is conducting, it adds current to the current coming from the diode 101; if it is the transistor 112 that conducts, it absorbs part of the current coming from the diode 101: this enables the values of the bias currents in the diodes 101 and 102 to be independent of each other.

Inductances 114 and 115 block the passage of AC modulation current through the circuits intended to conduct the DC bias current of the lasers. It is thus possible to independently adjust the optical power emitted by each of the lasers by means of adjusting potentiometers 105 and 110.

A modulation signal is applied to the input 116 of the transmitter, passes through amplification means 117 and is then applied via a coupling capacitor 118 to the assembly of the optical sources 101 and 102 arranged in series. The impedance matching between the output of the amplifier 117 and the optical source assembly is obtained either by inserting a resistor 125 added in series with the optical sources, or in another known manner, for example, by means of an impedance up-converter which is not shown. Connecting the optical sources in series facilitates this matching, because the impedance of an optical source or even of two optical sources in series is always notably smaller than the impedance of the usual electronic amplifiers: the impedance of an optical source being generally a few Ohms.

It is possible to use a dipole connected to the terminals of either optical source, for example, formed by a resistor 119 and a capacitor 121, or formed by a resistor 120 and a capacitor 122, for equalizing the efficiency of the electro-optical conversion of each of the two optical sources.

DESCRIPTION OF THE PREFERRED EMBODIMENTS

It is obviously possible to have more than two optical sources in series. The method of supplying power to the sources, both relating to the average bias current and the AC modulation current would be the same as before. The matching of the sources with the output impedance of an amplifier would even be easier.

Figure 2:
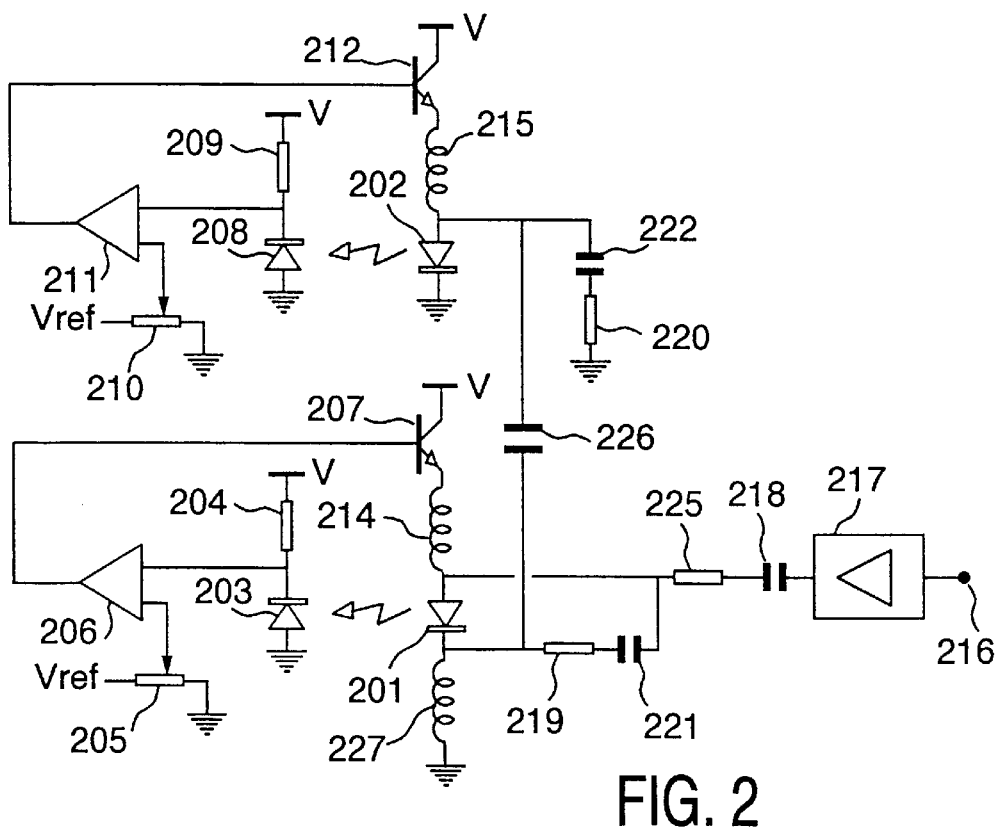

FIG. 2 features a second embodiment, including two laser diodes 201 and 202. The optical power emitted by each of the laser diodes 201 and 202 is kept constant and can be adjusted thanks to two negative feedback loops formed in identical manner to those of the diagram of FIG. 1. Inductances 214 and 215 block the flowing of AC modulation current through the circuits intended to conduct the DC bias current of the lasers. In the case where the optical sources would be light-emitting diodes, the latter would be separately supplied with power.

The modulation signal is applied to the input 216 of the transmitter, flows through the amplification means 217, is then applied via a coupling capacitor 218 to the assembly of the two optical sources 201, 202 arranged in series as far as AC modulation is concerned, thanks to the presence of the capacitor 226 and the inductance 227. The impedance matching between the output of the amplifier 217 and the optical source assembly is obtained by inserting a resistor 225. As before, it is possible to adjust the efficiency of converting electric current into optical power of either one of the two optical sources by having the circuit include a dipole formed by a resistor 219 and a capacitor 211, or a dipole formed by a resistor 220 and a capacitor 222.

The circuit of FIG. 2 features the same characteristics as that of FIG. 1 with the practical additional advantage that it enables to obtain zero/DC potential on the housing of each of the two lasers, which eliminates the risks of accidental short-circuiting, the housing of the laser diodes being most often electrically connected to one of the electrodes. Moreover, this circuit enables to optimize the frequency response of the circuit assembly. Actually, the inductance 227 is connected in parallel with the parasitic capacitance of the laser diode 202 and, therefore, forms an anti-resonant circuit that has a low "Q" factor. It is thus possible to compensate for any drop of the frequency response by adjusting the value of the inductance 227 so as to obtain the anti-resonance at the frequency for which the efficiency of the transmitter is desirably enhanced.

Figure 3:
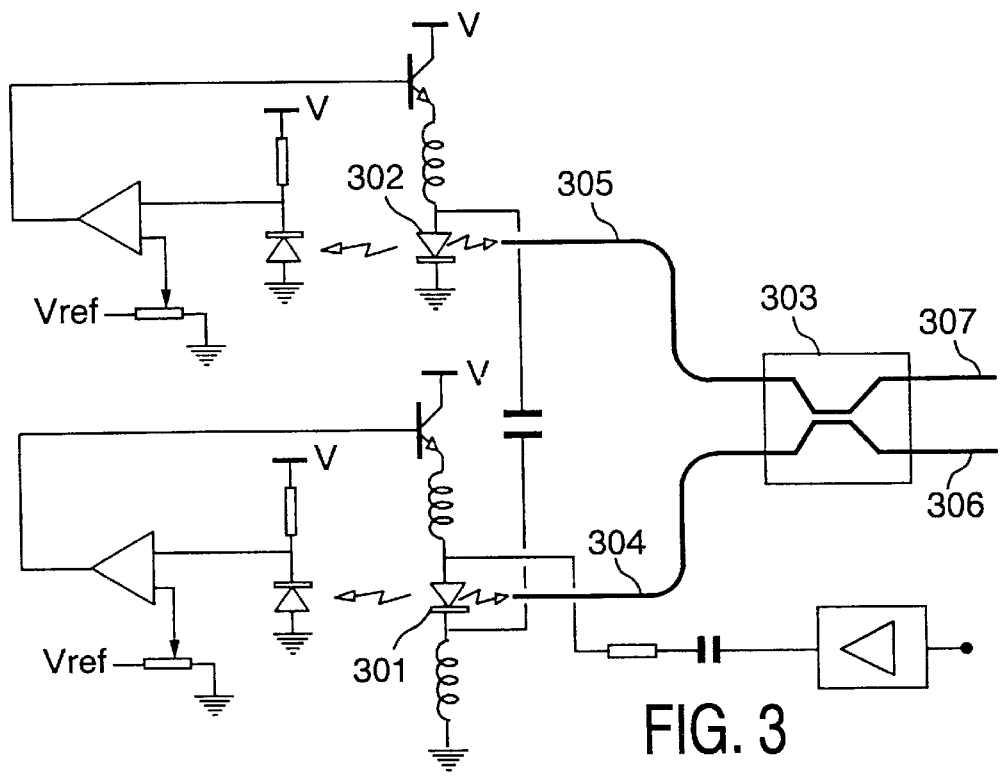

It is advantageous to add an optical coupler to the output of the optical sources in either one of the two preceding embodiments. FIG. 3 features the diagram of a transmitter that is fully similar to that of FIG. 2, including two laser diodes 301 and 302. Here each of the diodes sends light into an initial section of fiber 304 and 305 respectively, emitting to two optical fibers 306 and 307 via an optical coupler 303. The optical coupler has for its function to split the optical power emitted by the two laser diodes between the two fibers 306 and 307, each of the fibers receiving substantially half the power emitted by each of the diodes. Each of the optical fibers 306 and 307 transports the optical signals to one or various remote optical receivers, thus constituting the starting point of an optical transmission network. It is clear that the number of sources as well as the number of fibers may be increased.

In order to avoid possible problems linked with, on the one hand, the chromatic dispersion in the fiber, and on the other hand, possible interference between the radiation emitted by each of the lasers if the wavelengths of the lasers are too close together, it is important to make sure that the difference of transmission wavelengths of the lasers is compatible with an acceptable transmission quality of the signals. If need be, it is possible to influence the DC bias current or the temperature of either laser to satisfy the condition mentioned above as regards the transmission wavelengths.

An advantage of the diagram of FIG. 3 resides in an enhanced reliability. In case of a breakdown of one of the lasers, the optical transmitter continues to function with a reduced optical power. Actually, in case of failure, a diode laser or a light-emitting diode mostly features a low impedance and the presence of the failing diode does not form an obstacle to the proper functioning of the other diode. Thus the failure of one optical source in two simply results in the optical signal received by each of the receivers present in the network being diminished by 3 dB. The enhanced reliability thus obtained is interesting because the laser diode is the component that most often fails in an optical transmitter, and the additional cost consented to in exchange for this increased reliability is less than the cost of a traditional solution based on the use of two complete transmitters of which one is used as a back up in case the other breaks down.

Figure 4:
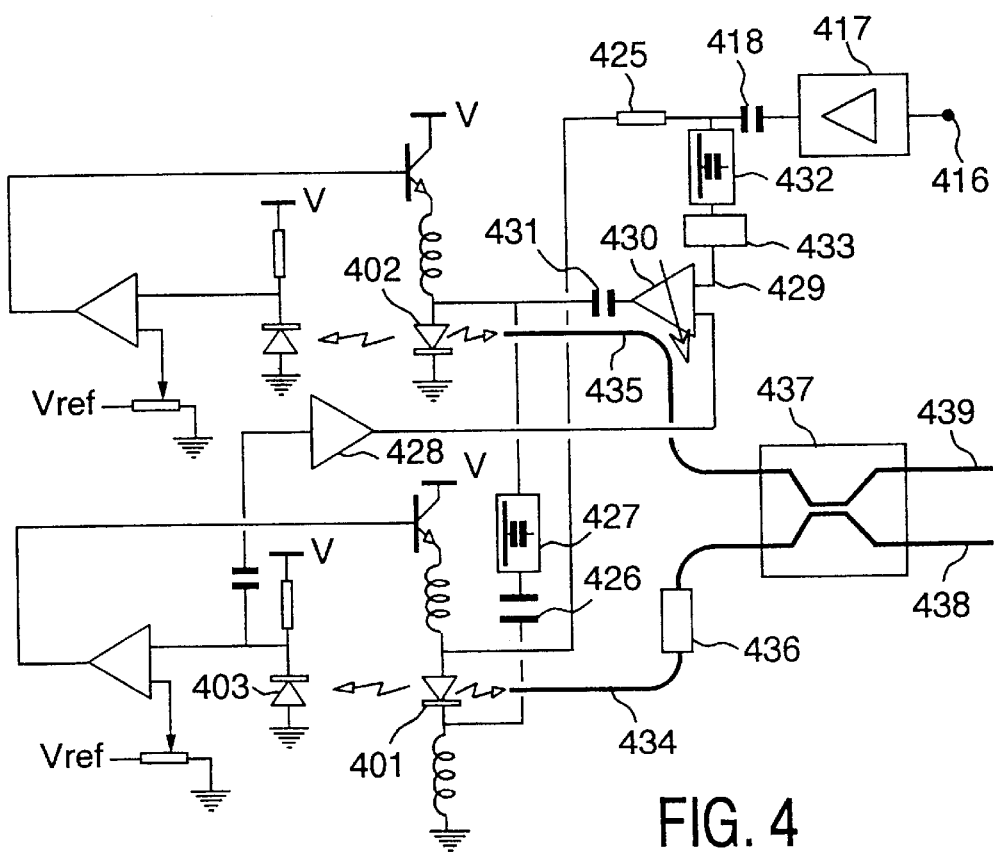

FIG. 4 features another embodiment including two optical sources 401 and 402. The laser sources here still have a negative feedback loop including a control photodiode, which enables to adjust the transmitted optical power. The modulation signal is applied to the input 416 of the optical transmitter, passes through the amplifying means 417, is then applied via a coupling capacitor 418 to the optical source 401 through the adapting resistor 425. The modulation signal is then transmitted to the second optical source 402 via the coupling capacitor 426 and a delay line 427. On the other hand, an amplifier 428 amplifies the AC component of the signal coming from the photodiode 403 separately from the DC component. The output signal of the amplifier 428 is sent to an input of a variable gain power amplifier 430, which receives on its other input 429 a signal equal to the signal present on the input 416 of the optical transmitter, but delayed as a result of the delay line 432, and attenuated by an attenuator 433. Thus, on the output of the differential amplifier 430 an "error signal" is avilable that is proportional to the distortion and the noise affecting the optical signal transmitted by the laser diode 401 and featuring an inverse polarity to this distortion and this noise, provided that the input terminals of the differential amplifier 430 are suitably assigned. This error signal is in that case transmitted via a capacitor 431 to the second laser diode 402. In this manner the laser diode 402 is fed with the sum of two currents:

one current coming from the delay line 427 and being proportional to the signal applied to the input 416 of the optical transmitter, one error current coming from the capacitor 431 and being proportional, except for the sign, to the distortion and the noise generated by the laser diode 401.

The sum of the two preceding signals may be obtained by simply connecting the two conductors that transport the signals, which is the case in the Figure, or by using a directional coupler or by any other known means.

The laser diodes 401 and 402 send light into initial sections of fiber 434 and 435, respectively. The initial section fiber 434 comprises an optical delay element 436 formed by an additional fiber length whose length is adjusted, so that the delay the light undergoes when it goes through this additional length, is equal to the delay the electric signal undergoes when it goes through the delay line 427, so that the optical signals emitted by each of the laser diodes are available in-phase at the inputs of the optocoupler 437. It is then possible to compensate the noise or distortion generated by the laser diode 401 thanks to an adapted adjustment of the gain of the differential amplifier 430 when the delay the signal undergoes when it passes through the processing circuit situated between the photodiode 403 and the capacitor 431 is equal to the delay of the electric delay line 427 and also to that of the optical delay line 436.

The characteristic of the laser diode 401 being described by the following relation between the current I and the emitted power $P_1$:

$$P_1 = \eta.I + a_1.I^2 + b_1.I^3,$$

in which $\eta$, $a_i$, $b_i$ are coefficients, and the characteristic of the laser diode 402 being described by the following relation between the current I and emitted power $P_2$:

$$P_2 = \eta.I + a_2.I^2 + b_2.I^3,$$

in which $a_2$, $b_2$ are coefficients, and by calling G the gain of the differential amplifier 430, the value of the signal on the output of the differential amplifier 430, that is to say, the error signal, is:

$$E = -G.a_i.I^2 + b_1.I^3.$$

In these conditions, it is possible to cancel the second-order distortion on the output of the optical transmitter by giving the gain G the value $G = 1 + a_2/a_1$. Similarly it is possible to cancel the third-order distortion on the output of the optical transmitter, provided that the gain of the differential power amplifier 430 is given the value $G = 1 + b_2/b_1$. Finally, it is possible to minimize the noise on the output of the optical transmitter, provided that the gain of the differential amplifier 430 is given the value $G = 1$.

It is thus possible to choose the gain of the differential amplifier 430 for minimizing either the noise, or the second-order distortion, or the third-order distortion, provided that the various delays are suitably adjusted and the measures mentioned above, against the possible effects of the chromatic dispersion in the fibers and against possible interference between the radiations emitted by each of the lasers, are taken.

After having passed through the optical coupler 437, the optical power emitted by each of the lasers is split between the two fibers 438 and 439. As above, it is clear that the number of fibers coming from the optical coupler and forming the network is not necessarily limited to two.

In the diagrams of the FIGS. 1 to 4, the cathode of the laser diode is supposed to be connected to the housing. If the anode were connected to the housing, it would be sufficient to change the polarity of the power supplies and the polarity of the transistors used.

What is claimed is:

1. An optical transmitter intended to transmit an optical signal through a broadband transmission network including at least one optical fiber that transports an optical signal from a transmitter to at least one optical receiver, the optical transmitter including at least two optical sources arranged in series and driven simultaneously, wherein the transmitter includes means for separately supplying DC bias current to the optical sources and for supplying AC modulation current to them in series, while the separate DC currents biasing the optical sources flow via at least two inductances that have a value that is sufficient to practically block the flowing of the AC modulation current, and wherein the two optical sources are directly connected in series, and in that the transmitter includes a push-pull arrangement whose output is connected to the common point between the diodes, so as to add or take out current from one of the diodes.

2. An optical transmitter as claimed in claim 1, characterized in that it includes a coupling capacitor between the two optical sources, a first optical source receiving the modulation signal on one of its electrodes and then transmitting the modulation signal to a second optical source by means of said coupling capacitor.

3. An optical transmitter as claimed in claim 2, characterized in that it includes an inductance ensuring the return to ground of the DC current polarizing the first optical source.

4. An optical transmitter as claimed in claim 1, characterized in that the optical sources are laser diodes.

5. An optical transmitter as claimed in claim 1, characterized in that the optical sources are light-emitting diodes.

6. An optical transmitter as claimed in claim 1, wherein the transmitter includes means for comparing the optical modulation signal emitted by the first optical source with a suitably delayed replica of the signal present on the input of the transmitter in order to generate an error signal proportional to the distortion and the noise affecting the optical signal emitted by the first optical source and means for feeding the second optical source with the sum of the error signal and the signal to be transmitted, means for delaying the latter so as to correct as exactly as possible the signal emitted by the first optical source, and means for combining the optical signals coming from each of the two sources after the addition of a suitable delay, by means of an optical coupler intended to feed the optical signal transmission network.

7. An optical transmitter as claimed in claim 6, characterized in that it includes means for adjusting the amplification of the error signal.

* * * * *